Dec. 22, 1925.  
C. HAMANN  
CALCULATING MACHINE  
Filed June 1, 1923    10 Sheets-Sheet 1

1,566,962

Inventor:
Christel Hamann
By Knight Bros
attys.

Dec. 22, 1925.
C. HAMANN
1,566,962
CALCULATING MACHINE
Filed June 1, 1923
10 Sheets-Sheet 2
Fig. 1ª
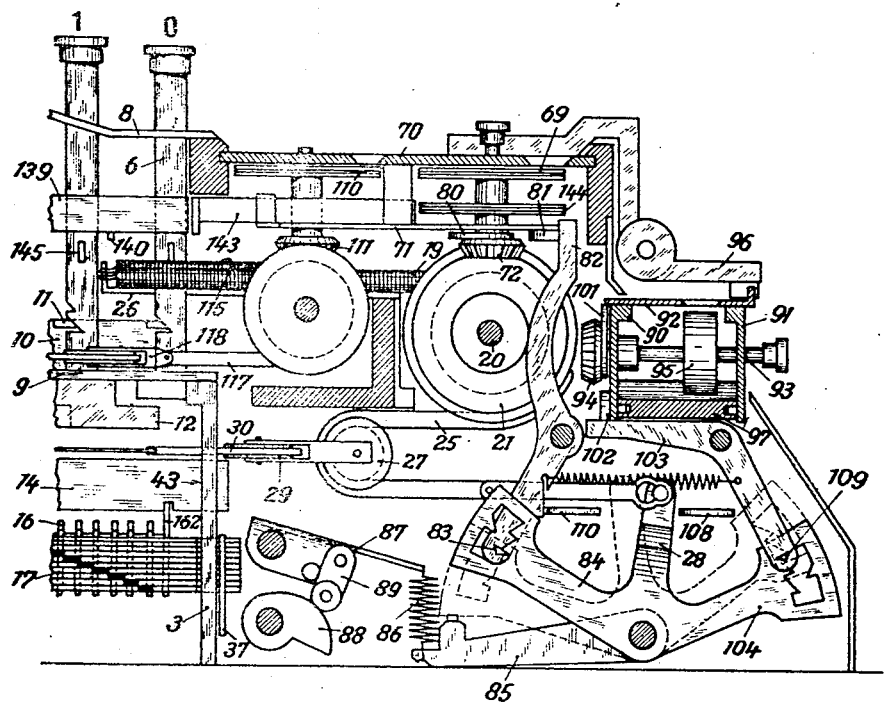
Inventor:

Dec. 22, 1925.          C. HAMANN          1,566,962
                    CALCULATING MACHINE
                    Filed June 1, 1923          10 Sheets-Sheet 3

Inventor:
Christel Hamann

Dec. 22, 1925.
C. HAMANN
CALCULATING MACHINE
Filed June 1, 1923 10 Sheets-Sheet 4
1,566,962
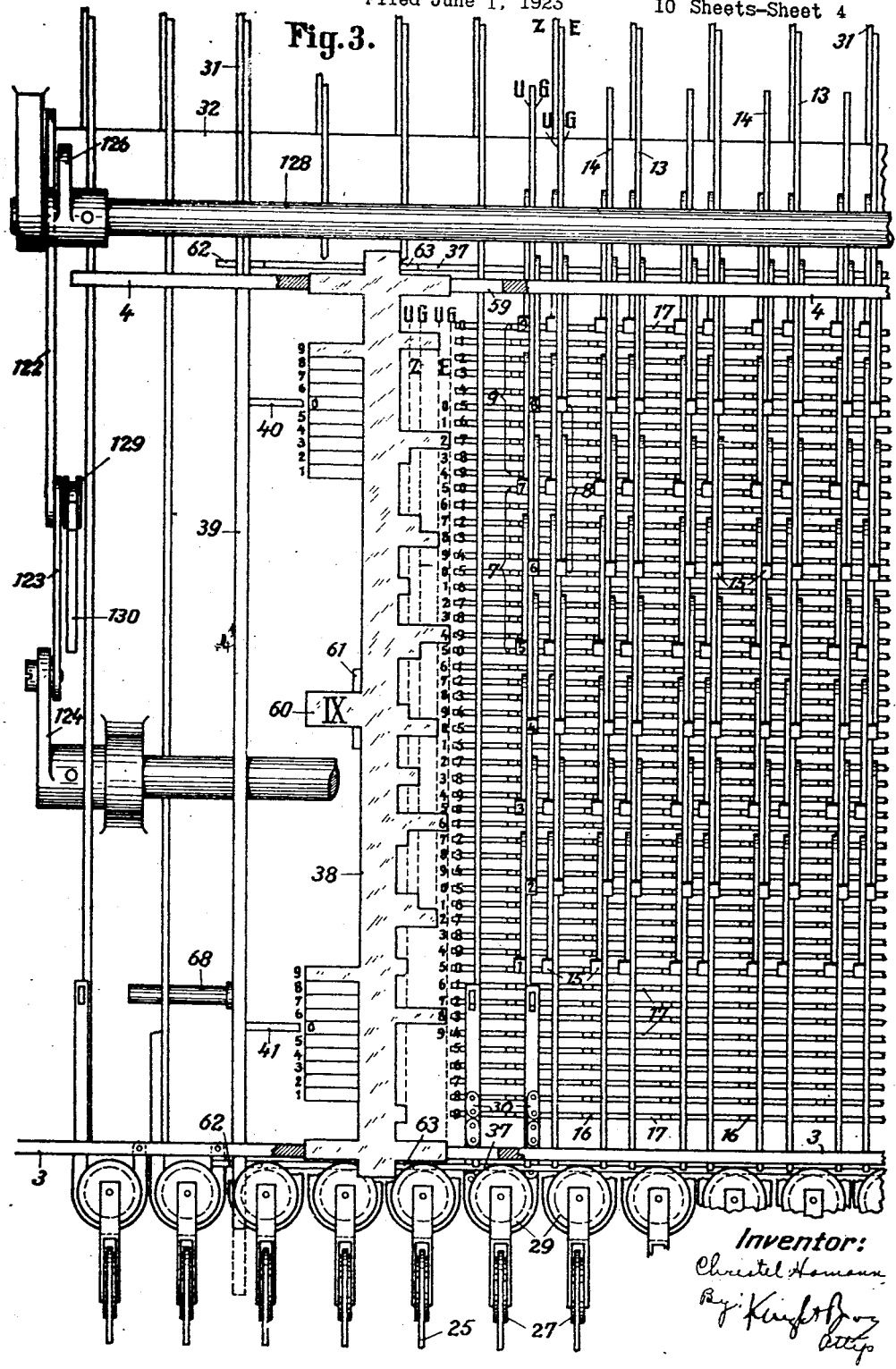

Dec. 22, 1925.  
C. HAMANN  
CALCULATING MACHINE  
Filed June 1, 1923  
1,566,962  
10 Sheets-Sheet 5
Fig.3.ª
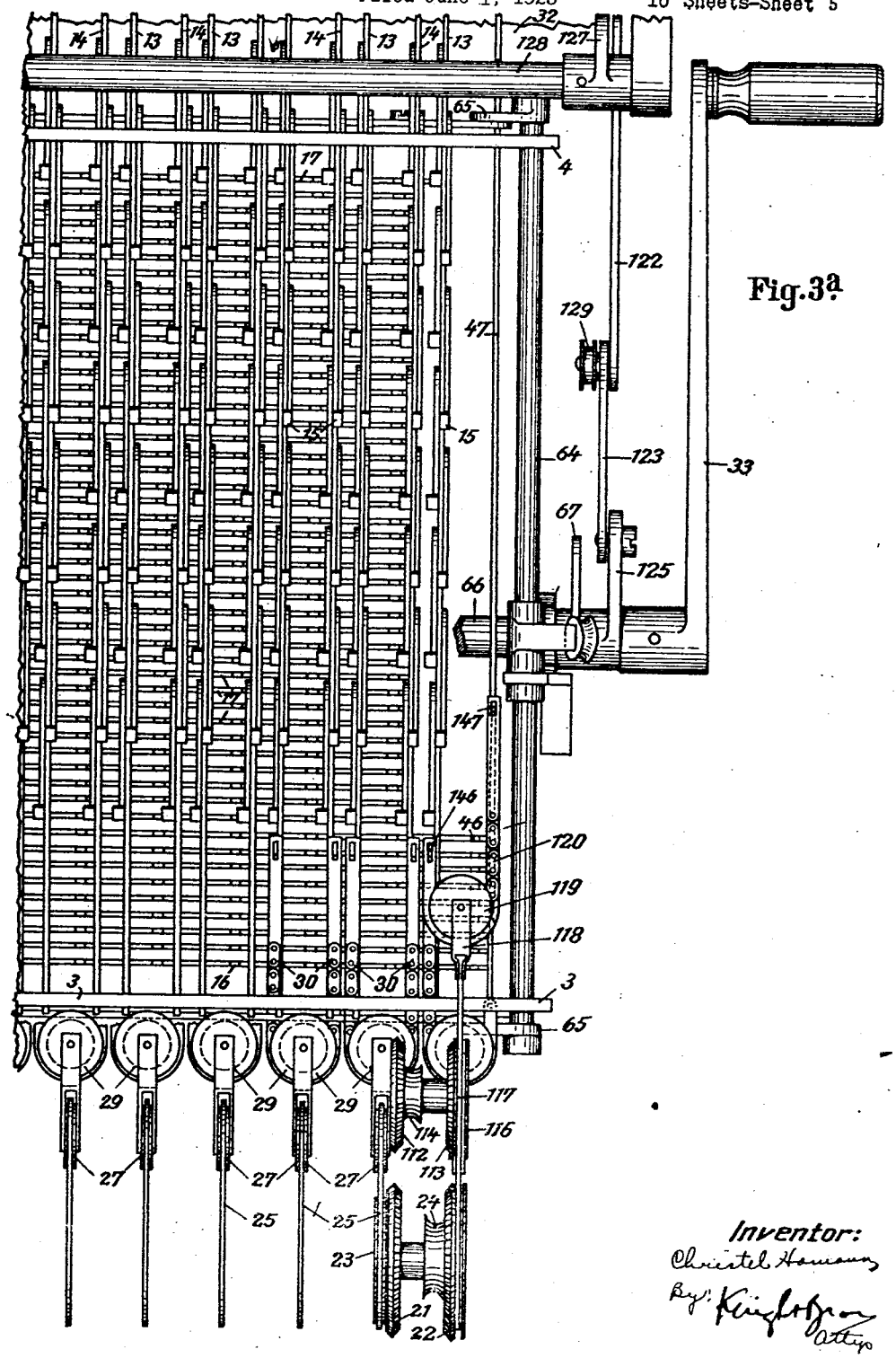
Inventor:
Christel Hamann Dec. 22, 1925.　　　　　　　　　　　　　　　　　　　　1,566,962
C. HAMANN
CALCULATING MACHINE
Filed June 1, 1923　　　10 Sheets-Sheet 6

Inventor:
Christel Hamann

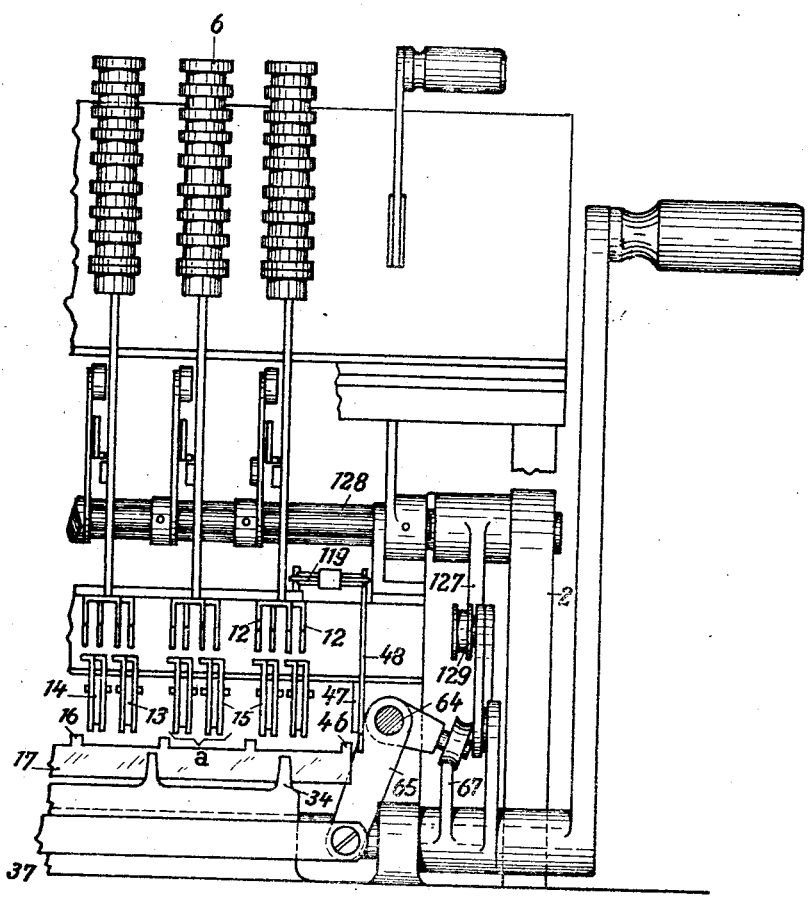
Fig. 4ª

Figure 6:
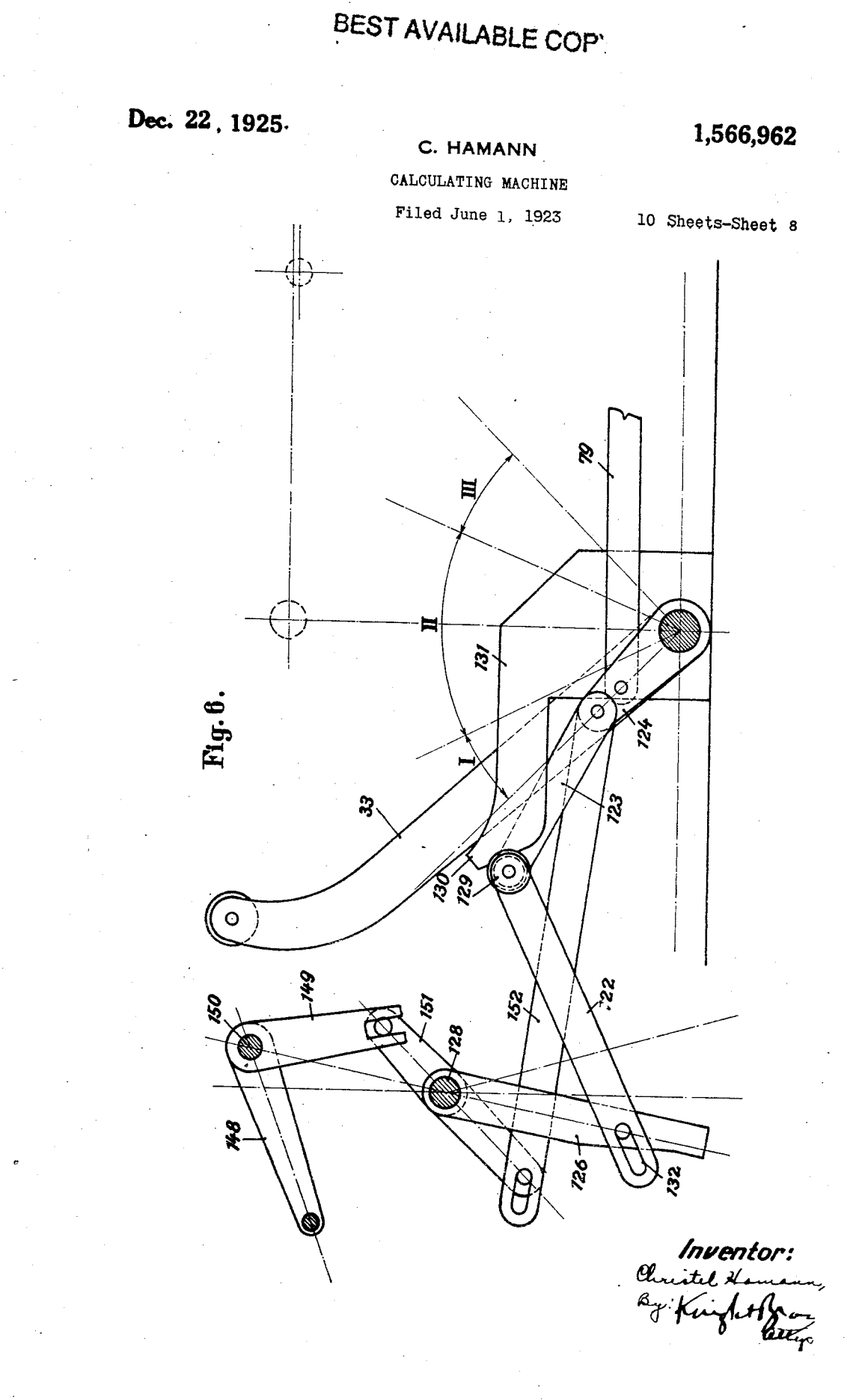

BEST AVAILABLE COPY

Dec. 22, 1925.

C. HAMANN 1,566,962

CALCULATING MACHINE

Filed June 1, 1923

Inventor:
Christel Hamann,
By Knight Bros
atty

Dec. 22, 1925.
C. HAMANN
CALCULATING MACHINE
Filed June 1, 1923     10 Sheets-Sheet 10
1,566,962
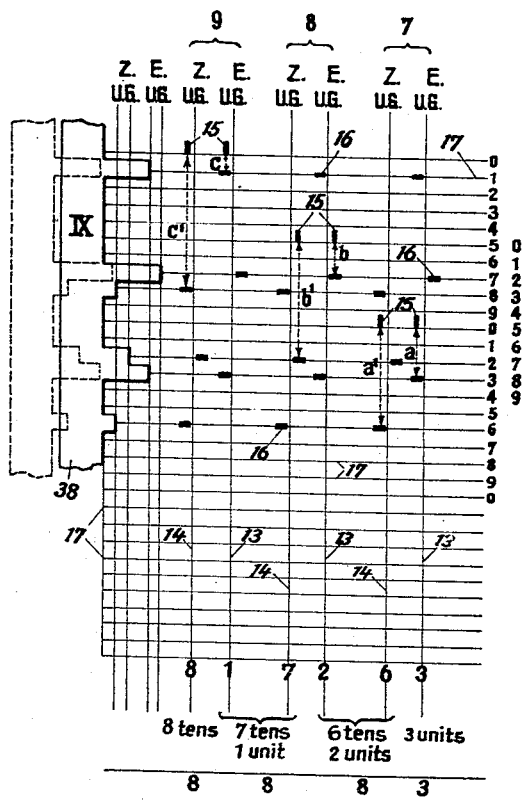
Fig. 8.
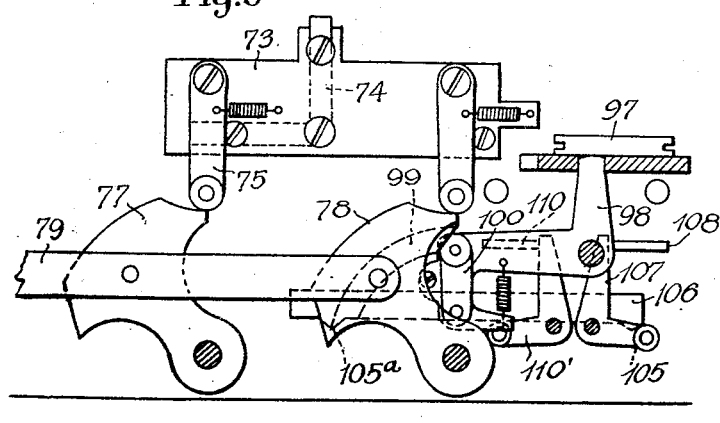
Fig. 6ᵃ
Inventor:
Christel Hamann,
By Knight Bros
attys Patented Dec. 22, 1925.

1,566,962

UNITED STATES PATENT OFFICE.

CHRISTEL HAMANN, OF NEUBABELSBERG, GERMANY, ASSIGNOR TO MERCEDES BÜRO-MASCHINEN- UND WAFFENWERKE, OF BENSHAUSEN I/THUR, POST MEHLIS, GERMANY.

CALCULATING MACHINE.

Application filed June 1, 1923. Serial No. 642,770.

*To all whom it may concern:*

Be it known that I, CHRISTEL HAMANN, a citizen of Germany, residing at Konigsweg 1, Neubabelsberg, Germany, have invented certain new and useful Improvements in Calculating Machines (for which I have filed an application in Germany on March 7, 1922), of which the following is a specification.

Calculating machines with multiplication elements have already become known, which, for the products of the multiplication-table separated into units and tens, comprise unvariable elements serving as abutments for moving members or being moved themselves. Machines of this type are of very complicated construction and require much space for the multiplication bodies, so that they are not easy to manipulate.

The machine itself, improved according to this invention moulds at the beginning of the operation the products of the multiplication-table in the form of abutments and arranges the same for each digit of the multiplicand into four groups which represent units and tens and even and odd numbers. In this manner much space is economized and it becomes possible to construct the product-forming elements, so that they can be manufactured in large numbers. The machine has two counting mechanisms and possesses a printing mechanism which not only prints the values registered by the keys but also the multiplicator and the results indicated by the counting mechanisms. The machine comprises further an arrangement according to which by one single manipulation the values registered by a counting mechanism may be adjusted in the feeding mechanism of the machine, e. g. the keys, mechanically in accordance with the number indicated by a counting mechanism.

In the drawings:—

Figs. 1 and 1ª show in side elevation part of the machine.

Fig. 2 illustrates the adjusting device of the multiplicator.

Figs. 3 and 3ª show the feeding mechanism in plan view.

Figs. 4 and 4ª are a front elevation, the front wall being removed.

Fig. 5 shows the front wall.

Figs. 6 and 6ª illustrate the driving mechanism in connection with the feeding mechanism of the counting mechanisms.

Fig. 8 illustrates diagrammatically the multiplication members in working position.

Figure 1:
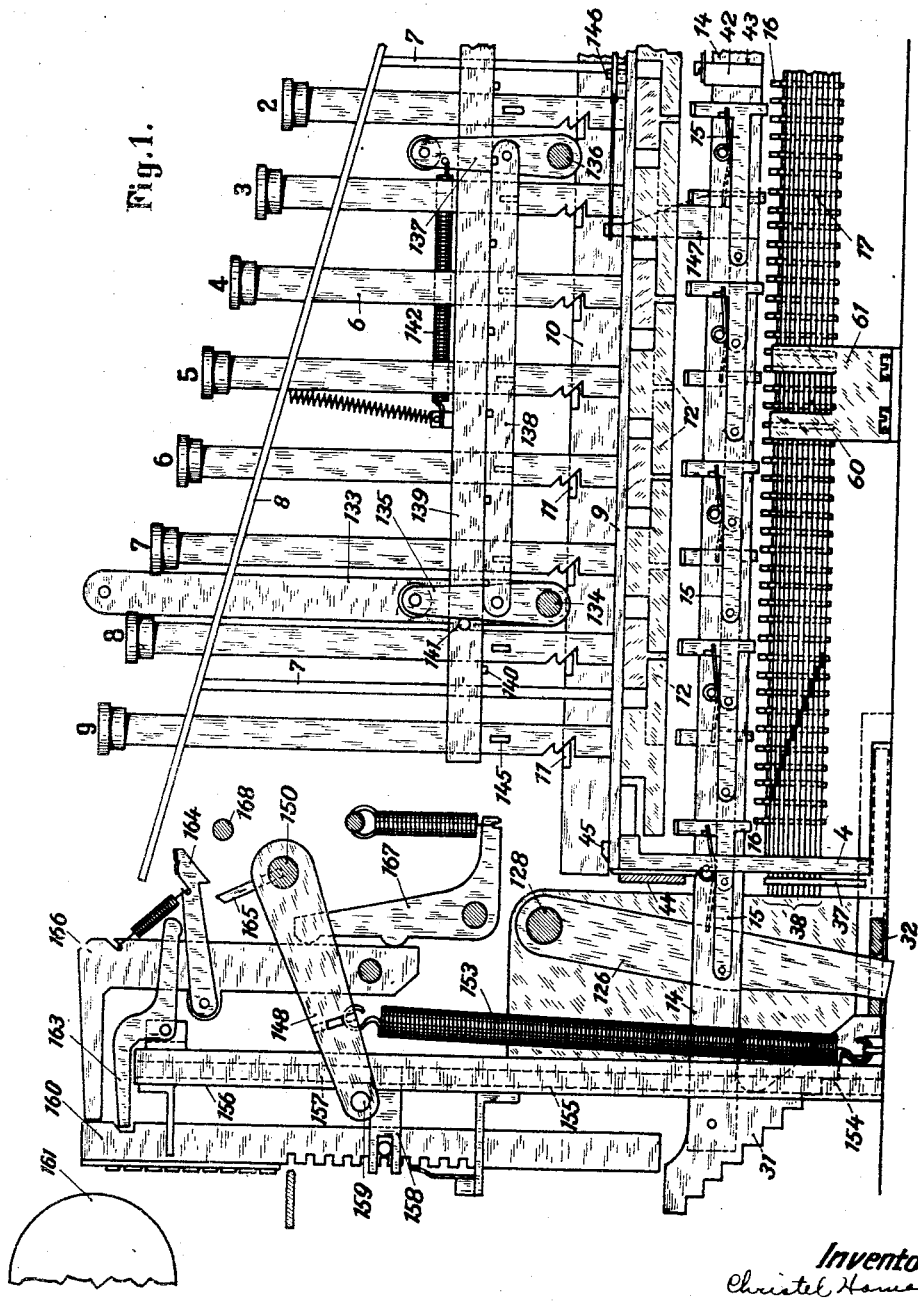

The side walls 1 and 2 (Fig. 4) and the front wall 3 and rear wall 4 (Figs. 1 and 2) are mounted on a base not shown on the drawing. This base supports further several brackets for the receptions of members which will be mentioned later on. Ten pairs of slits 5 (Fig. 5) and six single slits are cut into the front and rear walls. With the ten pairs of slits 5 correspond the ten rows of keys 6 which form together the multiplicand. The keys numbered 0 to 9 of each row are fixed on rods of different lengths. They are mounted in groups in a frame fixed upon the walls 3 and 4. The two stays 7 and the bars 8, 9 form the frame. The locking bar 10 which rests upon the bar 9 engages in the well known manner with its bent flaps 11 into the notches of the key rods to retain and release each one key if another key of the same row is being adjusted. By means of springs not shown the keys are held in the upper position. On the lower ends of the key rods U-shaped extensions 12 (Figs. 1 and 4) are riveted which are regularly displaced with regard to one another as they are alternately riveted to the rods at one side and at the other side.

For each digit five of these U-shaped extensions 12 are arranged at the left and four at the right. These extensions are of such a width that they are almost in contact in longitudinal direction. Under each row of keys two bars 13 and 14 are arranged which are guided in the slits 5 of the walls 3 and 4, so that they can be easily displaced. Each bar 13, 14 carries nine L-shaped arms 15 four of which are arranged at the right and five at the left (according to the even and odd numbers). By a spring traversing the bar with its one end at the right hand side, and with the other end at the left hand side these bars are held in the upper position shown in Fig. 4. The shorter arm is bent at its upper end and extends below the extensions 12 of the keys. If a key is being depressed two arms 15 of one pair of bars 13, 14 are depressed also so that their lower projections get on the path of the abutments 16 of the rails 17. If one key is being operated two arms 15 are adjusted.

These arms are situated either at the right or at the left of the bars 13, 14 according to whether the depressed key represents an even or an odd value.

At the state of rest the abutments 16 of the rails 17 do not interfere with the movement of the bars 13, 14 as they are not in the operative position as shown. If, however, one of the rails 17 is moved to the right so that an abutment 16 gets into the range of one of the arms 15 and the bars 13 or 14 can be displaced only until one of the arms 15 comes in contact with a projection 16. The bars 13, 14 have the tendency to move under the action of a spring 19. One spring 19 (Fig. 1) acts uniformly upon the two bars 13, 14 for reasons which will be hereinafter explained. With this object in view as many elements, each composed of two bevel wheels 21, 22 (Figs. 1 and 3) are mounted on the shaft 20 journaled in the side walls 1 and 2 as the counting mechanism of the machine has digits (16 in this case). With the bevel wheel 21 a rope pulley 23 is rigidly connected and with the bevel wheel 22 a grooved pulley 24 which latter serves for guiding the spring 19, the first one serving for guiding the chain 25. One end of the spring and one end of the chain are fixed to the respective pulleys. The other end of the spring 19 is hooked on a hook 26. The chain 25 goes round the pulley 27 and its other end is attached to the arm 28 of an anchor which may at present be considered as stationary. A pulley 29 in connection with the pulley 27 serves for guiding a chain 30. The right hand side end of this chain is connected with the left hand side bar the other end with the right hand side bar of two pairs of bars 13, 14. The spring 19 being permanently under tension the bars 13, 14 are pulled towards the right by means of the elements 25, 27, 29, 30. At the state of rest of the machine the bars cannot move under the action of the spring as the stepped arms 31 of the same bear with their lower ends against a rail 32 extending transversely from one side to the other of the machine. Only if this rail 32 is moved to the right by the rotation of the crank 33 the bars 13, 14 follow the rail 32 until they are stopped by one of the abutments 16. The length of travel of bars 13, 14 depends partly on the depressed pair of arms 15 partly on the position of the abutments 16.

How the arms 15 of two groups of bars 13, 14 are adjusted in pairs has been already described; it may however be stated further that of each pair of bars which are close together the bar situated on the right hand side represents the units, the bars on the left hand side representing the tens, the right hand side arms 15 of any bar, indifferently whether it is a units or tens bar, representing the even numbers, the left hand side arms representing the odd numbers. The springs 19 act, as already mentioned, at the same time upon a left hand side bar 14 of a pair of bars situated at the right hand side and upon a right hand side bar of the pair of bars situated at the left hand side.

Figure 4:
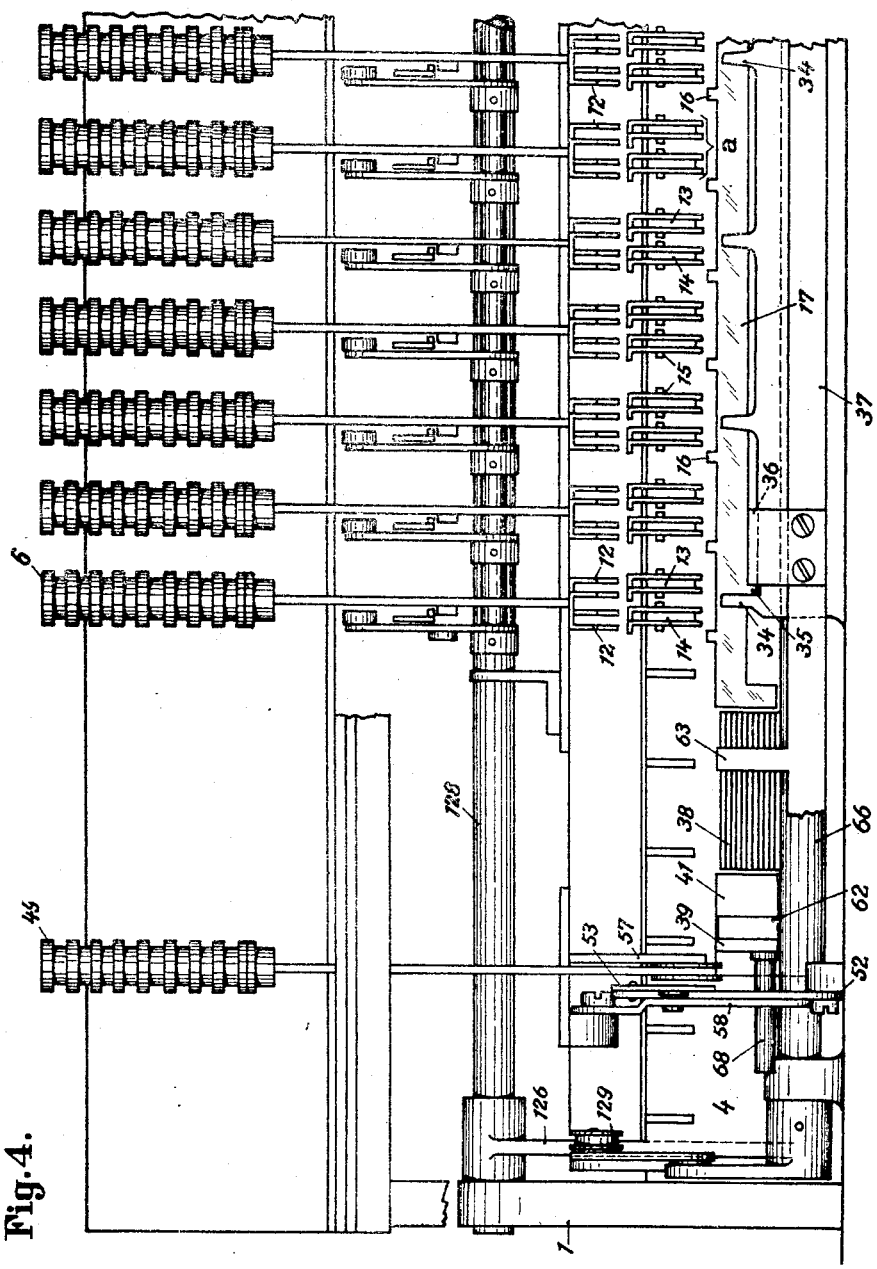
Figure 7:
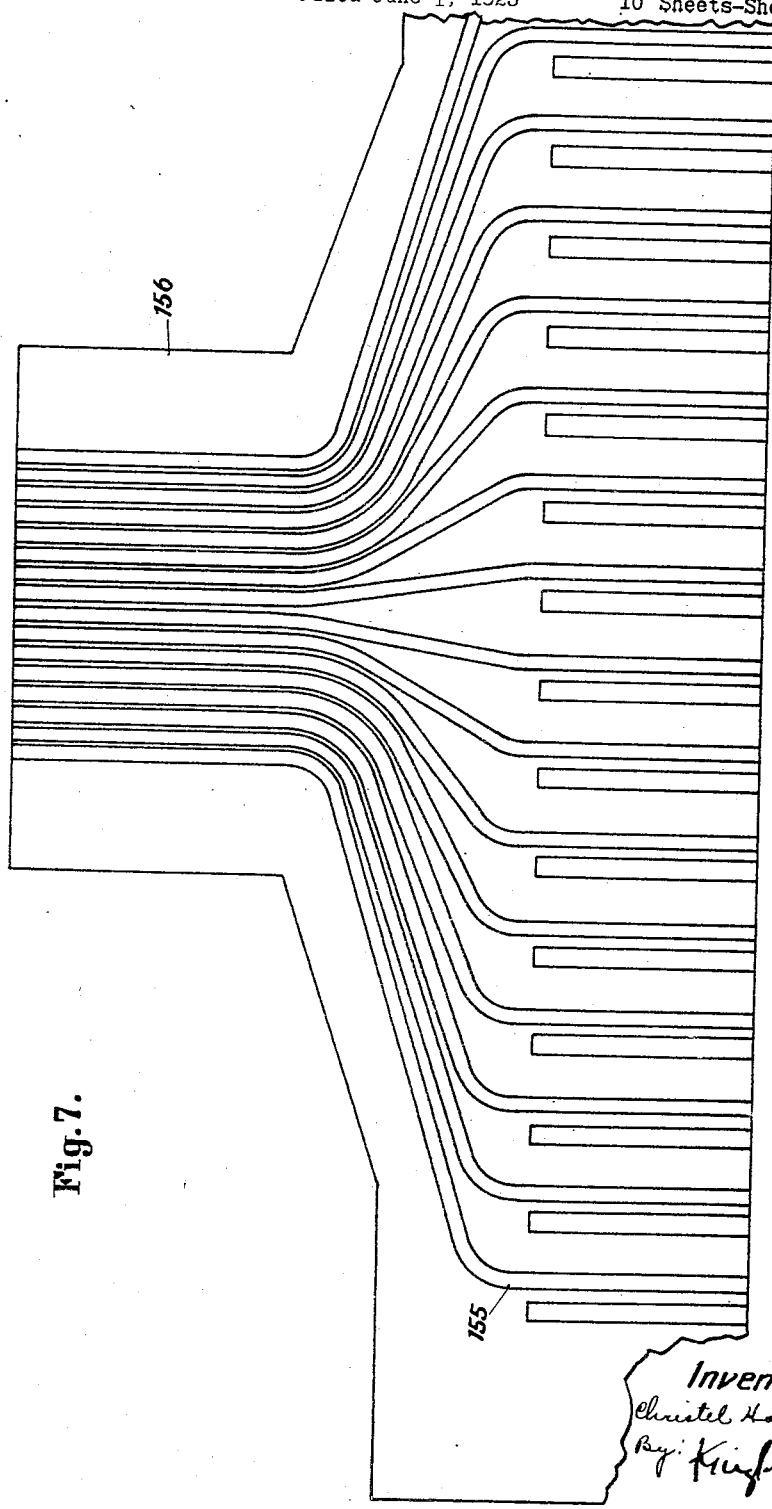
Fig. 7 shows the rear wall with channels for the printing-mechanism.

By the division of a multiplicand digit into units and tens and by the further subdivision of the same into even and odd numbers four groups a are formed for each digit, which are represented by the arms 15 which viewed from the front in Fig. 4 are spaced at uniform distances apart. The abutments 16 may be shifted for distances which correspond with the distance between the arms 15, e. g. they may adopt, besides the idle position shown in Figs. 3 and 4, four different positions.

The bars 17 which carry the abutments 16 are movably mounted, spaced the one from the other at a distance of 3.6 mm. in ribs 34 (Fig. 4) of a bracket made in one piece with the base plate. The ribs have the shape of a rake, if seen from the side. A rail 36 is arranged at the left hand side (Fig. 4) which at its ends, at the front and rear ends of the machine, is attached by screws to the connecting rods 37 and bears against the small projections 35 of the rails 17. These rails 17 are secured in their position partly by this rail and partly by contact with the ribs 34. The rails 17, fifty in all, and all of the same shape, have at the left hand side each a short downwardly projecting arm.

Ten strips of sheet metal 38 are piled up at the left hand side of the machine in the plane of the rails 17, said strips 38 being of different shape, length and grouping, and they serve for adjusting the rails 17 with the projections 16 in order to bring the same opposite one of the arms 15 in accordance with the four-fold grouping of said arms.

The tongues of these ten strips are different as regards length and place which are selected according to the following consideration: In order to obtain for the bars 13, 14 greater intervals without making these bars longer the arms 15 are arranged on either of said rails so that the nine arms which are displaced with regard to one another overlap each ten abutments 16. The arms 15 which correspond with the even numbered keys 2, 4, 6, 8 are arranged at the opposite side of the bars from those which correspond with the odd numbered keys 1, 3, 5, 7, 9. This arrangement is the same for all the bars for the units and the tens, four groups in all. With these four groups correspond the four different lengths of the tongues of 38 (Fig. 3) which each adjust one rail 17 with abutments 16 in one of the four groups, e. g. simultaneously for all places of the multiplicand. The length of a tongue determines therefore whether units or tens of the product and of these even or odd numbered figures of the multiplicand are to be considered. The place is determined on the one hand by the multiplicand and on the other hand by the value which the product of the multiplication-table indicates, as will be hereinafter described. The ordinate is divided into four parts but the abscissa is divided into ten parts. Each of the ten parts of the abscissa represents however not only values of one multiplicand number but of two, comprising the succeeding one, as the abscissa parts which correspond with two adjacent multiplicand numbers overlap one another for one half; the abutments 16 of the ten-part abscissa group, which represent the value 8 of a place of the multiplicand, overlap for instance towards one side the part of the abscissa which represents the value 9, and towards the other side the part of the abscissa which represents the value 7. This mixing of the values is based upon the displacement of the arms 15 of even values between those of odd values.

The products of the multiplication-table by 9—

$$9 \times 1 = 9$$
$$9 \times 2 = 18$$
$$9 \times 3 = 27$$
$$9 \times 4 = 36$$
$$9 \times 5 = 45$$
$$9 \times 6 = 54$$
$$9 \times 7 = 63$$
$$9 \times 8 = 72$$
$$9 \times 9 = 81$$

are represented by the upper multiplicator plate 38 (Fig. 3). If this plate "9" is shifted to the right in the manner which will be hereinafter described, determined abutments get opposite the arms 15, whereby the travel of the bars 13, 14 is limited. In order to form the product from $9 \times 9 = 81$ the key numbered "9" (the upper one in Fig. 1) has to be adjusted as multiplicand and the key numbered "9" of the multiplicator group, which will be hereinafter described, has to be adjusted also.

As stated, the arms 15 are lowered at the adjusting of the multiplicand in order to serve as abutments, at the adjusting of a multiplicator key 49 (Fig. 2) the rail 39 with its arms 40, 41 (Figs. 2 and 3) will have to be displaced in longitudinal direction. According to the key which has been adjusted the arms adjust themselves with regard to the tongues of the multiplication strips 38, two for one strip. If for instance "9" is adjusted the arms stand opposite the tongues which belong to strip "IX". If the crank handle 33 is pulled forward the rod 39 and its arms move to the right in Fig. 3 and selects from the pile of strips the corresponding strip and pushes the same to the right. In the diagram shown in Fig. 8 the top strip, the strip for the nine, has moved to the right whereby the upper tongue of plate IX has displaced the abutment rail designated in column U by 1 in accordance with the value "1" of the product. As now this "1" represents the unit of the product and has originated from an odd multiplicand the arm 15 has to be brought into the group E U and as E U is the third group from the left hand side the tongue has the length of three strips. At the same time the third short tongue has displaced the bar 17 numbered "8" according to the value "8" of the product "81" and as "8" is a ten-value and originates also from an odd multiplicand all abutments 16 of this bar stand in column U of the group "Z", e. g. in the first group. This tongue has therefore the length of one step. If now the bars 13, 14 are displaced the arms 15 of the unit-bar come in contact with the abutment 16 after having travelled for one step, those of the tens-bar coming in contact with the abutment after having travelled for eight steps, so that the distances through which they have travelled represent the product 81. If the multiplicand is "8" instead of "9", the arm of the key numbered "8" being therefore adjusted, and if the value "8" has to be multiplied by "9" = "72", the arms 15 of the bar designed in column G by "2" of the group of the multiplicand "8" in column G of group E stop the bar 13, e. g. this bar moves for two steps according to the unit value "2" of the product "72". The fourth tongue drives the seventh bar of the group "8" to the right according to the tens-value "7" of "72". The length of this tongue is calculated so that it adjusts the seventh abutment rail in the group Z, G, as "7" is one of the tens and originates from an even multiplicand. The movement of the tens-bar 14 is thus stopped after seven steps. If the multiplicand is "1" the lowest pair of arms, designated "1" is adjusted and if this value has to be multiplied by "9" the last but two tongue adjusts the abutment rail designated "0" on G. Z, "even tens" so that the tens-bar is not displaced as the product from $9 \times 1$ does not comprise a "ten". The unit bars are not stopped by the abutments 16 if the value of a product is 9, in any group, however "9" being the highest figure the chain hook 42 of a unit bar (Fig. 1) will come in contact with the wall 3 forming thus the stop which corresponds with the distance 43.

The diagram Fig. 8 shows a row of groups for the adjustment, a main group for the decades of the multiplicand, embodied by the adjusting bars 13, 14 with arms 15. Each main group is subdivided into two groups, tens and units, and these groups are again subdivided each into two groups "even" and "odd". For the main group one abutment 16 is provided for each place of the multiplicand said abutment being adapted to be adjusted for one of the four sub-groups so that, if it is co-ordinated in a place of the multiplicand to a determined group, it fills always the same group in any other place. The tongues of the multiplication strips 38 have also four steps in accordance with the four groups. The longest step adjusts the abutments 15 in the sub-group E G, the next following in E U, the third in Z G and the shortest in Z U of all the main groups.

According to the diagram the multiplication strip 9 has completed its adjusting, some of the rails 17 with the abutment 16 have been shifted to the right for a longer or shorter distance, owing to the tongues of the strip. In this adjusted position each multiplicand is multiplied by "9". In the present case given by way of example the multiplicand is 987 and the result 8883. The multiplicand-keys have been depressed accordingly and the arms 15 (indicated in the diagram by black squares) have been adjusted accordingly. These arms are situated, according to whether they represent even or odd values, either at the right or at the left of the adjusting rails and they are always adjusted in pairs one in the units-group and one in the tens-group.

Each multiplication strip 38 travels always for the same distance. The length of the tongues is calculated so that they displace the rails 17 in such a manner that their abutments 16 get on the path of the arms 15. In the left hand side main group the key "9" has been depressed, in the middle group the key "8" and in the right hand side group the key "7". If one imagines now the bar 13 of the main group "7", sub-group E U, moving downward in the longitudinal direction it will be stopped on the left hand side, the odd side, after it has travelled for the distance $a$ which is equal to three units. The next following bar 14 of group Z of the main group in left hand side direction is stopped also after having moved to the left for the distance $a'=6$ units so that the distances, separated into units and tens, have formed the product of $9 \times 7 = 63$. As the multiplicand is an odd number the stopping in Z and E has taken place at the left.

In the middle main group the multiplicand "8" is an even number and consequently the stopping takes place in the right hand side groups Z and E at G, so that the tongues of the strips 38 must be of corresponding length. At the shifting the tens bar displaces itself for a distance $b'=7$ units up to the abutment whereby the product "72" is obtained. In the last main group at the left stands an odd multiplicand figure "9" which must be stopped at the left hand side. The bar in E U is stopped after one step has been executed, distance $c$ and in Z U distance $c'$="8" units, so that one unit and eight tens have been represented by the bars in the group "9"=81 (the product). The distances $a\ a'$, $b\ b'$, $c\ c'$ are covered all at the same time in the manner described, the tens being added at the same time to the units in a manner which will be hereinafter described so that the simple multiplication-table products subdivided into units and tens are finally transformed into the part-product.

Figure 2:
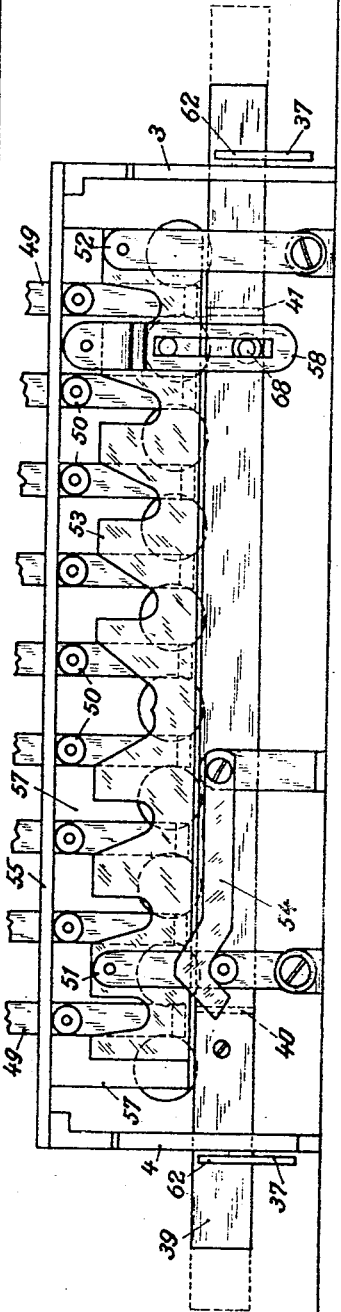

In the case that the multiplicand comprises zeros, so that no keys have to be adjusted or depressed the locking rail 10 has the position shown in Fig. 1. In this position the extreme left hand end side of said rail rests upon the slide 44, the lower end of which engages with a notch of the bar 14 and holds the same. If, however, any value is indicated by depression of the keys the indentation 45 gets over the slide so that this slide can give way and the rail can move.

If the multiplicator comprises a zero the strip of pile 38 is operated which carries the tongue "0". This strip has at its lower end only one single short tongue which stands opposite the last bar 162 designated "9" which, as already been mentioned above, does not serve as abutment. This rail 162 is larger than the other rails as can be seen from Fig. 1 and projects into indentations of the bars 13, 14 if it has been displaced by the corresponding tongue, which means if the multiplicator comprises a "0". In this position all bars 13, 14 are locked. If, however, this locking rail is at the normal position, e. g. if any other figure of the multiplicator is adjusted but "0" indentations in said rail permit free play for each of the bars 13, 14.

In order to record the multiplicator which has been adjusted the nine abutment rails situated in front (the lower rails in Fig. 3) are extended towards the right so that they present a special stop 46 (Fig. 3), adapted to be adjusted by short tongues of the strips 38. These short tongues are displaced in accordance with the values of the strips. The strip "9" has the tongue, as shown on the drawing, quite at the lower end; the tongue of the plate "8" being situated one step higher with regard to rail 8 and so on. A rod 47 similar to the bars 13, 14 but without arms is situated above the stop 46. Instead of the arms this rod 47 has one single projection 48 adapted to come in contact with the stop 46 (Fig. 4) if this stop has been adjusted. If, for instance, the multiplicator is "5" the rod 47 can travel for five steps, this movement being transferred upon a counting mechanism which will be hereinafter described.

The adjusting of the multiplicator figures or of the multiplication strips 38 is effected in the following manner. At the left of the group of keys 6 designed for the multiplicand a single row of keys 49 (Fig. 2) is arranged the shafts of which have rollers 50 which at the depression of a key act upon inclines of a plate of sheet metal 53 suspended on pendulums 51, 52. The inclines are of different pitch and ascending to the right and to the left so that at the depression of the keys numbered 1, 2, 3, 4, 5 the plate of sheet metal oscillates towards the right. The other keys make the same oscillate to the left. This measure serves to reduce the stroke of the keys. In order to ensure that the plate of sheet metal 53 returns always to its normal position an elastic hook-shaped lever 54 grips over a roller of the pendulum 51. The key shafts are guided at the upper end in the frame 55 and at the lower end between rollers 56 revolvably mounted on support 57. On the same support the pendulum 58 is oscillably mounted through the slit of which projects a pin fixed in the plate 53 of sheet metal and in the rail 39. If the pendulum oscillates away from the adjusting plate 53 its movement is transmitted at the ratio of 1×2 upon the rail 39 the arms 40, 41 of which are thus adjusted opposite to one pair of tongues of the strips 38. For ensuring a parallel displacement two arms 40, 41 are arranged and also two tongues on each strip 38.

Figure 5:
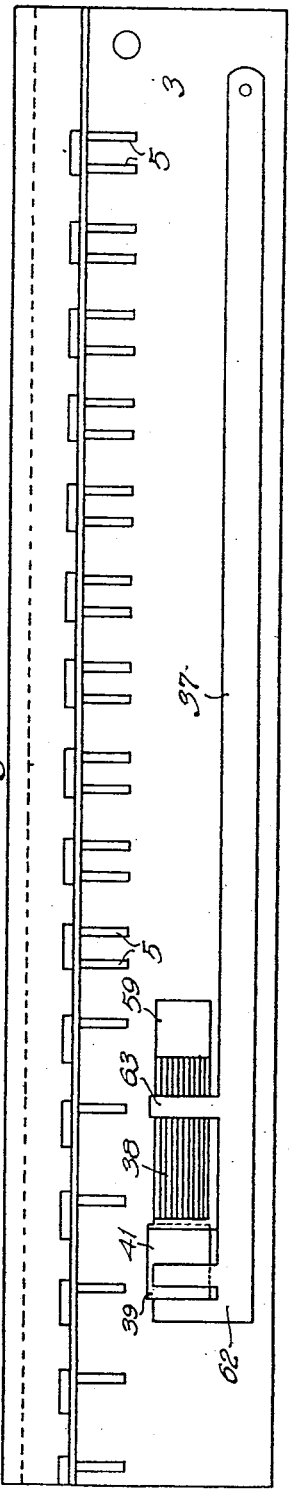

The enlarged ends of the strip 38 are located in indentations 59 (Figs. 3 and 5) of the walls 3 and 4. The strip has flaps 60 at the middle which are embraced by a clasp 61 in order to prevent displacement in longitudinal direction. The extreme ends of the strips are supported each by an arm of the two guide rods 37, said guide rods having at their extreme left hand side ends the forks 62 which overlap the adjusting rail 39 at either end (Figs. 3 and 5).

The right hand side ends of the connecting rods 37 are hingedly connected with levers 65 fixed on the axle 64. If the crank handle 33 is operated these levers are operated through the intermediary of a cam 67 fixed upon the driving shaft (Figs. 4 and 5) upon which a roller rests which is mounted on a lever which is also keyed upon the axle 64. At the oscillation of the lever 65 the guide rods are thus pulled to the right whereby the adjusting rail 39 which selects by its arms 40, 41 one of the ten strips 38 in accordance with the multiplicator and pushes these strips out of the pile, whereby the abutment bars 17 are adjusted in accordance with the tongues of said strips differing as regards place and length. At the back movement of the crank handle if the lever 65 swings backward the arm 63 of the guide rod 37 pushes the strips back into the pile, the rail 36 returning the abutment rails 17 to their normal positions.

The pin 68 projecting through the pendulum 58 and fixed in the adjusting rail 39 is of such a length that it remains securely guided even if the adjusting rail moves to the right. At the beginning of the specification the pulleys 27 and 29 have been mentioned. Around pulley 29 a chain 30 is wound which is attached with the one end to the bar 14 for the tens and with the other end to the bar 13 for the units of the next higher place. From this arrangement results that the pulley 29 moves for half the sum of the distances through which both bars travel, with the object in view to add the tens of a place of lower order to the units of a next higher place. If for instance 75 has to be multiplied by 9 the product is composed of the following part-products 5×9=45 and 7×9=63, these part-products being added so that the tens 4 of 45 is added to the unit 3 of 63 according to the formula $$\begin{array}{r} 45 \\ 63 \\ \hline 675 \end{array}$$

The movement of a pulley 29 is proportional to the sum of the units and tens and according to the above example it will travel 7/2 distances which are however multiplied again by 2 by means of the pulley 27 so that the element 21 winds up the real length 7 of the chain or in general the sum of units and tens to be transmitted to a counting mechanism.

The counting mechanism consists of a row of number disks 69 which are superposed and keyed with their hubs on axles journaled in the two plates 70, 71 so that they can easily revolve. The axles have bevel wheels 72 at their lower ends which come alternately in gear with one of the bevel wheels 21 or 22 of the elements according to whether addition or subtraction has to be done at the multiplication or at the division. As at the operation of the crank handle the bevel wheels rotate in the manner explained above in accordance with the product formed in the adjusting mechanism the bevel wheels 72 participate in this rotation which is thus indicated by the number disks 69.

In order to prevent the back rotation of these number disks at the back rotation of the driving crank at the return stroke of the bars 13, 14 the bevel wheels 21, 22 and their axle 20 are movable in vertical direction so that they are coupled when the machine is operated but uncoupled when the machine elements return to the normal position. This arrangement is shown in Fig. 6. The casing of the counting mechanism has walls 73 at either side which are mounted by means of the guide pieces 74 in the frame of the machine. Two pendulums 75, 76 are pivotally mounted on each wall 73 so that under the action of a spring these pendulums are held in the perpendicuar position. Rollers mounted at the free ends of the pendulums bear on cams 77, 78 adapted to be operated by the connecting rod 79 if the machine is working. By the oscillation of the cams in right hand side direction the casing of the counting mechanism is at first raised to be lowered again shortly before the stroke of the crank is completed as the rollers slip off the incline arranged at the left hand side of the cams. As the pendulums 75, 76 oscillate against the action of the springs the casing of the counting mechanism remains in the lowered position also at the back movement of the crank handle. The bevel wheels 72 are therefore in gear with the bevel wheels 21 or 22 during the largest part of the stroke of the crank handle but out of gear at the return movement of the same. If a number disk 69 rotates from 9 to 0 or at subtraction inversely from 0 to 9 the finger 80 strikes against a roof-shaped projection of a one-armed lever 81 connected with the casing of the counting mechanism. This lever operates in its turn the two-armed lever 82 which at its lower arm carries the locking piece 83 which grips behind teeth of an escapement 84 shaped like an anchor to the arm 28 of which the end of the chain 25 is attached.

This arm 28 is permanently controlled by the spring 19 so that it will oscillate to the left if the locking piece releases one tooth. This is the case if the finger 80 strikes against the lever 81. The levers 81, 82 and 28 are arranged in such a manner that the release of the locking piece is effected at the next following place in left hand side direction if at the preceding place a "0" has appeared under the window. If the escapement 84 is now released the arm 28 oscillates under the action of the spring, whereby the element 21, 22 rotates and communicates its movement to the corresponding number disk. Cases might occur which require in the course of the formation of a part-product, e. g. during one stroke of the crank handle, two transmissions of tens. Such a case occurs in the following problem: The product from 39×9 has to be calculated and to be added to a value —90 left over from a preceding calculation

```
  90
  81
  27
 (2)
 ---
 441
```

In order to prevent that the escapement does not always operate two teeth in succession a stop tooth is arranged opposite the two teeth, said stop tooth bearing upon the locking piece if this has been swung out. After one or two transmissions of tens have been carried out the escapement must be returned to the position shown in order to be ready for the next following transmission of ten. This has to be effected during the return-movement of the crank handle and with the aid of levers 85 situated under each arm 84 of the escapement. Upon each of these levers 85 acts one spring 86, all said springs being suspended to a flap 87 adapted to be raised at the back-rotation of the crank handle by means of a cam 88. As the lever 89 which has a roller swings out at the back movement of the crank handle the flap remains inoperative at the working stroke of the crank handle.

The machine has a second counting mechanism for adding the products the casing of which is formed by the two walls 90, 91 and the plate 92 with window. In the walls 90, 91 the shafts 93 are journaled on which the cog wheels 94 and the number disks 95 are mounted. By means of the pawl 96 adapted to be thrown in and out of gear the second counting mechanism can be coupled with the first mentioned counting mechanism so that it may participate or not in the sliding movement of the same. The casing is guided by the plate 97 which executes such movements that the cog wheels 94 are periodically coupled with the cog wheels 21 or 22. This coupling movement is controlled by the elbowed lever 98 (Fig. 6) which embraces the plate 97 for the casing so as to displace the same for a short distance, the sector 99 bevelled at both ends engaging with the roller of an oscillable lever 100 hingedly connected with the longer arm of said elbowed lever 98. At the working stroke of the crank handle the roller will give way but at the idle movement of said crank handle the sector will grip over the roller and displace the counting mechanism by its guide plate 97 to the left so that its bevel wheels come in gear with the bevel wheels 21 or 22. Whilst the first mentioned counting mechanism was in gear at the working stroke of the crank handle the second counting mechanism is in gear at the idle movement of the crank handle, this being necessary as a transmission of tens in the one mechanism must not be transmitted to the other mechanism. If in the second counting mechanism a "0" appears in the window the finger 101 (Fig. 1) strikes against the lever 102 which makes the angle lever 103 oscillate, whereby the arm 104 of the escapement is released in a similar manner as the opposite arm 84.

At the working stroke of the crank handle the roof-shaped projection 105 of the rail 106 pushes through the intermediary of the angle lever 107 the rail 108 (Figs. 1 and 6) to the right, whereby the locking means 109 of the angle lever 103 is rendered inoperative (Fig. 6). Prior to the idle movement of the crank handle the projection 105ª makes the angle lever 110ª oscillate which acts upon the rail 110 so that this rail strikes against the lever 82 (Fig. 1), whereby, owing to the spring 19, the escapement 84, 104 jumps into the position indicated in dotted lines. By the idle stroke of the crank handle the springs 86 are put under tension so that they act through the intermediary of the lever 85 upon the escapement which however cannot move under this action as it is locked by the locking piece 109 until a transmission of tens takes place. In this case the arm oscillates contrary to what occurs at the transmission of tens of the first counting mechanism to the right, whereby the element 21, 22 is rotated in inverse direction. As however the second counting mechanism is operated at the idle stroke of the crank handle the rotations are executed in inverse direction as in the first mentioned counting mechanism so that in this case the transmission of the tens means the additional movement in the same sense of rotation.

The projection 105 of the rail 106 moves also at the idle stroke along the roller of the elbow lever 107, whereby the rail 108 strikes shortly upon the levers 103 so that those of the escapements which should not yet have adopted the position shown owing to a transmission of the tens are brought into this position. The spring 86 is slack at the end of the idle stroke of the crank handle so that the spring 19 enters again into action being ready to execute a transmission of tens which should become necessary in the first mentioned counting mechanism at the working stroke of the crank handle. At this working stroke a transmission upon the first mentioned counting mechanism including transmission of tens is therefore effected and at the idle stroke of the crank handle transmission upon the second counting mechanism and also transmission of tens by the same element the bevel wheels 21, 22 and the escapement 84, 104. If the one counting mechanism is engaged the other one is disengaged and if the one mechanism for the transmission of tens is ready for work the other one is inoperative.

The multiplicator is recorded by the figure disks 110 which are arranged together with the figure disks for the product in a common case and which are superposed also. On the lower end of their axle a bevel wheel 111 having 18 teeth according to the figures 0 to 9 and 9 to 0 is mounted. These bevel wheels mesh, like the bevel wheels of the counting mechanisms with bevel wheels 112 or 113 (Fig. 3) according to whether addition (multiplication) or subtraction (division) has to be done. The bevel wheels 112 and 113 form also one element which is however single in opposition to the double elements of the counting mechanism. The spring 115 is wound around the rope pulley 114 and attached with its fixed end to the hook 26. A chain 117 is wound around the pulley 116, the one end of this chain is attached to the pulley and consequently to the element, the other end carrying the block 118 in which the roller 119 is mounted. A chain 120 wound around the roller 119 is suspended with one end to a fixed part 146 of the machine and with the other end to the arm 147 of rod 47. This rod has at its extreme end a stepped arm 31 similar to the arms of the unit bars 13 which permits the printing of the multiplicator figures and it has further an abutment 48, designed to come in contact with the abutments 46 whereby finally the multiplicator is formed in the figure disks 110.

For carrying out feeding movements at the correct time the course of the crank handle is subdivided into three periods. At the first period the first counting mechanism is thrown in gear, at the second period this counting mechanism is operated and at the third period it is thrown out of gear. At the idle stroke the second counting mechanism is in engagement at the third period, driven at the second period and disengaged at the first period. The movements for the operation of the releasing rails 108, 110 take place at the first and third periods and the flap 87 is operated; the springs 86 are put under tension and the transporting of the counting mechanism takes place at the third period of the idle stroke. In order to prevent the operation of bars 13 and 14 during the feeding of the first counting mechanism the connecting rod is composed of two halves 122 and 123 (Figs. 3 and 6). The bent connecting rods are arranged at either side of the machine and they are connected on the one hand with the cranks 124 and 125 and on the other hand with the levers 126, 127 keyed on the axle 128. The parts 122 of the connecting rods have each an oblong hole 132 in their free end by means of which they slip over a screw neck of the levers 126. The ends of the levers 126 engage with the rail 32 (Figs. 1 and 3) against which the stepped arms 31 bear. As these stepped arms 31 are submitted to the action of the spring 19 the rail 32 and consequently also the levers 126, have the tendence to move to the right. This is however not possible as the rollers 129 (Fig. 6), of which one is arranged at each joint of the parts 122, 123 of the connecting rod, bear on curved guides 130 arranged at either side of the machine. These curved guides form the end of one arm of plate 131 and they move along an arc of circle which has the length of part 122 as radius. If the crank 33 is being moved to the right the roller rolls at first, during the first period, along the arc of circle, the lever 26, the rail 32 and the adjusting bars 13, 14 being at rest whilst the connecting rod 79 and the cams 77, 78 are operated so that the first mentioned counting mechanism is thrown in gear. Only hereafter begins the second period, the rollers 129 get off the curved guides and slide along the horizontal guide whereby finally the adjusting bars 13, 14 are released so that they operate the counting mechanism. If the crank handle arrives at the third period the rollers of the levers 75, 76 get off the cams 77, 78 and the first mentioned counting mechanism is disengaged. If at the end of the third period the direction of movement of the crank handle is reversed the second counting mechanism is thrown in gear in the manner above described and as the levers 75, 76 act only in one direction the first mentioned counting mechanism remains disengaged. Owing to the oblong hole 132 in the arms 122 the levers 126 and consequently also the adjusting bars 13, 14 are not moved back for the present during the back movement in the third period. Only after the second counting mechanism has been thrown in gear the second period begins during which the adjusting bars 13, 14 operate on their back travel the second counting mechanism which is disengaged at the beginning of the first period.

In order to clearly explain the operation of the machine the following example of a multiplication is given:—9876×54=563304.

By means of the keys 6 the multiplicand 9876 is adjusted in the well known manner and as the multiplicator comprises two figures the counting mechanism is thus brought in the well known manner to the second decimal place. The highest place of the multiplicator is then adjusted by the keys 49, whereupon the crank handle is pulled. The counting mechanism moves to the next, the first decimal place, whereupon the next higher multiplicator value is adjusted and the crank handle is pulled again. After in this well known manner the multiplicator has been adjusted and the crank has been pulled alternately the product is registered in the counting mechanism.

By adjustment of the multiplicand the arms 15 are brought in pairs, with the aid of the U-shaped extensions 12, on the path of the abutments 16 and by the adjusting of a multiplicator key the rail 29 with its arms 41 gets opposite the tongues of those multiplication strips 38 which corresponds with the keyed multiplicator value. At the movement of the driving crank the strip which has been selected is pushed to the right, whereby the rails 17 are also displaced so that the abutments 16 are brought on the four paths of the adjusting bars 13, 14 in the groups Z U G and E U G forming thus a multiplication body which corresponds to the actually adjusted multiplicator value and comprising symbols for the units as well as for the tens. At the subsequent operation of the crank handle the adjusting bars are moved in longitudinal direction through the action of the spring 19 and through the intermediary of the element 21, chain 25, rollers 27 and 29 and chain 30, this latter chain operating on the one hand the unit bar 13 and on the other hand the tens bar 14 of the next higher place. At this movement the adjusting bars 13 and 14 travel for distances which are equal to the units and tens of the products of the multiplication table.

In the example given the units- and tens-bars represent, after the adjusting of the multiplicator 5 after the first pull of the crank handle the values:

$$9876 \times 5 = 45 - 40 - 35 - 30$$

which represent products of the multiplication table. By the gear 29, 30 (pulleys and chains) the tens are added to the units so that according to the formula:

$$\begin{array}{r} 30 \\ 35 \\ 40 \\ 45 \end{array}$$

the part-product=49380 is produced.

This value is finally indicated by the figure disks 69. At the back movement of the crank handle the toothed wheel 72 disengages from the element 21 and the carriage 70 moves for one step to the left. The multiplication plate V is again pushed into the pile 38 until, after the back stroke of the crank has been completed all mechanisms have again adopted their normal positions, the spring 19 being put under tension. The second digit of the multiplicator "4" is adjusted and the crank handle is operated again, whereby the part-product 39504 is registered which is added during its formation to the part-product which has already been registered in the counting mechanism according to the formula:

$$\begin{array}{r} 49380 \\ 39504 \\ \hline 533304 \end{array}$$

At the adding of the two part-products a transmission of tens is required at several places in the counting mechanism. How this transmission of tens operates has been described.

Some calculations, for instance the frequently occurring calculations of the formula $$a \times b \times c = x$$

require the re-adjustment of the product from $a \times b$ to multiply the same by $c$. In order to bring this by a simple manipulation into the keys the crank handle 133 (Fig. 1) is arranged. This crank handle is keyed on axle 134 (Fig. 1) on which as many levers 135 are fixed as there are rows of keys. A second axle 136 situated in the same plane carries a similar number of levers 137. Each pair of levers 135, 137 is hingedly connected with one another by a rod 138. If the crank handle 133 is being pulled the levers move along the arc of circle in yielding towards the right. Between the rows of keys rods 139 are arranged which have on their lower side lateral projections 140 which are displaced after the manner of a vernier with regard to the distance between the keys. Each rod 139 has a pin 141 which, through the action of spring 142, is pressed against one of the levers 135. If this lever oscillates to the right the rods 139 follow the movement until they are stopped by the slides 143. These slides are mounted in the cases of the counting mechanisms and they are adapted to come in contact with steps of the stepped disks 144 which are regularly stepped in accordance with the numbering. The shallowest step corresponds with the figure "9" and the deepest step corresponds with the figure "0." If "9" appears in the window the rail 143 and consequently the rod 132 moves for a shorter distance than at "0." At the figure "9" a projection 140 stands opposite the projection 145 of the key "9," at "8," a rod 139 has moved farther for one step so that the second projection 140 stands over the projection of the key "8" and so on. At "0" the last projection stands at the right hand side over the projection of the zero key. After in this manner one projection 140 has been brought over one projection 145 of any key in accordance with the value in the window, the rod 139 does not move further to the right but the levers 135, 137 do, whereby the spring 142 is further extended and the rollers of the levers are finally pressed on the back of the rod 139. This rod is thus parallelly moved downward drawing along the key the projection of which corresponds with the projection of 139. Independently whether a key has previously been adjusted or not, one key will always be released if it does not accurately correspond to the value in the window. A claw, not shown on the drawings, arranged at the right hand end of rod 139, serves to draw along the key rail 143. If the rod 139 moves back the claw must evidently permit the lateral displacement of the counting mechanism.

The machine comprises a device for printing the values adjusted by the keys and indicated by the figure disks. Upon shaft 150 (Fig. 6) two levers 148 are keyed which stand approximately at right angles to the levers 149 keyed also on said shaft 150. The levers 149 have fork-shaped free ends gripping over a pin of the levers 151 which have two arms of equal length, the other arm carrying also a pin. These pins engage with the oblong holes of the connecting rods 152 suspended at their other ends on cranks of the driving shaft. As soon as the crank handle begins the second period the lever 148 begins to swing upward whereby the springs 153 (Fig. 1) are put under tension so that they draw along slides 154 guided in channels 155. The wall 156 has channels 155 (Figs. 1 and 7) which converge in upward direction with the object to reduce the distance between the adjusting bars of the keys and the figure disks to the printing distance. In the upper orifices of the channels which are close together slides 157 (Fig. 1) are arranged which carry each an arm 158 over which the rod 159 is situated which is designed to ensure that the slides can move upward only if this rod gives way. Between the slides 154 and 157 a row of elements (balls, small disks or the like) is arranged which produce a rigid connection between said slides. In accordance with the value adjusted by the keys the adjusting bars 13, 14 are moved and consequently also the steps 31 are moved to the right. According to whether such a stepped body is displaced more or less the slide raises for one step and transmits its movement in upward direction to the slide 158 which is free to slide upward as at the operation of the machine the rod 159 oscillates in upward direction. The arm 158 grips with its fork-shaped end over a pin of the type rod 160 and draws the same along so that the type of the type rod is brought opposite to cylinder 161.

If the value of the first mentioned counting mechanism has to be printed the adjusting has to be effected by means of a key separately to be operated by hand and not shown on the drawing, this key serving to prevent that the levers 82 give way, to bring the bevel wheels 72 into the subtraction position and to make the locking rails 162 (the last rail of group I numbered "9") release the adjusting bars 13, 14. If the crank handle is now operated the springs 19 work until the fingers 80 come in contact with the levers 81, wherefrom results that the adjusting bars and consequently also the steps 31 represent the value registered in the counting mechanism, this value being printed in a similar manner as a value which has been previously adjusted by the keys.

At the upward movement of the type rod 160 the lever 163 drives downward the hook 164 which gets into the range of the catch 165, this catch oscillating with the lever 148 and pulling back the hammer 166. This hammer is spring-controlled at both sides by the percussion lever 167. If the hammer 166 is sufficiently put under tension the hooks 164 are removed through the intermediary of the rod 168 from the catch 165 so that the hammer 166 presses the type against the cylinder so that the same is printed.

I claim:—

1. In a calculating machine of the type described, multiplication elements newly arranged in accordance with the products of the multiplication table at each setting of the multiplicator, and members selected at the setting of a multiplicand and adapted for movement in dependence upon the arrangement of said multiplication elements.

2. In a calculating machine of the type described, means for setting a multiplicator, multiplication members selectively movable at each setting of a multiplicator, said multiplication members having lugs newly grouped in accordance with the products of the multiplication table upon each selective movement of said members, means for setting a multiplicand, and elements selected at the setting of a multiplicand and adapted for movement in accordance with the grouping of said lugs.

3. In a calculating machine of the type described, means for setting a multiplicator, multiplication members selectively moved at each setting of a multiplicator, said multiplication members having lugs newly grouped in accordance with the products of the multiplication table upon each selective movement of said members, means for setting a multiplicand, elements selected at the setting of a multiplicand and adapted for movement in accordance with the grouping of said lugs, and means for integrating the movements of pairs of said elements.

4. In a calculating machine of the type described, means for setting a multiplicator, multiplying members consisting of parallelly disposed rails selectively moved in their longitudinal direction at each setting of a multiplicator, said rails having lugs newly grouped in accordance with the products of the multiplication table at each setting of a multiplicator, means for setting a multiplicand, and movable elements selected at the setting of a multiplicand, the limits of movement of said movable elements being determined in accordance with the grouping of said lugs.

5. In a calculating machine of the type described, means for setting a multiplicator, multiplication members selectively movable at each setting of a multiplicator, said multiplication members having lugs newly grouped in accordance with the products of the multiplication table upon each selective movement of said members, means for setting a multiplicand, and movable elements selected in pairs at the setting of a multiplicand, the limits of movement of said movable elements being determined in accordance with the grouping of said lugs, each of said lugs being adapted to assume four cooperating positions relative to a pair of said movable elements.

6. In a calculating machine of the type described, means for setting a multiplicator, means for setting a multiplicand, movable elements selected at the setting of a multiplicand, stop members for determining the limits of movement of said movable elements, and means for grouping said stop members for cooperation with said movable elements in accordance with the products of the multiplication table, said grouping means comprising series of tongues selectively moved as to series on the setting of a multiplicator, each of said series comprising tongues of four different lengths and each series corresponding to a digit of the system of numeration.

7. In a calculating machine of the type described, means for setting a multiplicator, means for setting a multiplicand, movable elements selected at the setting of a multiplicand, parallelly disposed rails relatively movable in their longitudinal direction, said rails having lugs adapted to determine the limits of movement of said movable elements and means for selectively displacing said rails whereby said lugs are grouped in accordance with the products of the multiplication table for cooperation with said movable elements, said displacing means comprising series of tongues selectively moved as to series at the setting of a multiplicator, each of said series comprising tongues of four different lengths and each series corresponding to a digit of the system of numeration.

8. In a calculating machine of the type described, multiplicator keys, multiplicand keys, movable bars selected by the latter keys, adjusting elements corresponding to digit values selected by the former keys, each of said adjusting elements having steps arranged in accordance with its numerical value, shiftable rails, each of the steps of said adjusting elements being arranged for cooperation with one of said rails, said rails having lugs adapted to be brought into the paths of said movable bars, and means for displacing a selected adjusting member, whereby the movements of said movable bars determined by said lugs represent the units and tens of the products of the multiplication table.

9. A structure according to claim 8, wherein the adjusting elements are each provided with a projection on its edge opposite to said steps, said projections being in stepped arrangement, and a selector element movable opposite the projection of a respective adjusting element on the operation of a multiplicator key.

10. In a calculating machine of the kind described, a units bar and a tens bar slidably arranged in the machine, arms on each of said bars representing digit values, means for slidably displacing said bars, stops settable in the path of said bars, and means for displacing selected arms relative to their respective bars for abutting said stops, as and for the purpose described.

11. In a calculating machine of the kind described, a units bar and a tens bar slidably arranged in the machine, arms on each of said bars representing digit values, the arms representing odd values and those representing even values being disposed on opposite sides of their respective bars, means for slidably displacing said bars, stops settable in the path of said bars, and means for displacing selected arms relative to their respective bars for abutting said stops, as and for the purpose described.

12. In a calculating machine of the kind described, a units bar and a tens bar slidably arranged in the machine, arms on each of said bars representing digit values, the arms representing odd values and those representing even values being disposed on opposite sides of their respective bars, means for slidably displacing said bars, stops settable in the path of said bars, figure keys, and forked elements displaceable on the actuation of respective keys and in turn displacing an arm of each of said bars, said displaced arms being adapted to abut said stops for determining the movement of said bars.

13. In a calculating machine as described, a plurality of alternate tens and units bars slidably arranged in the machine, a flexible connection between said bars, a pulley engaging said connection, a second pulley connected with the first pulley, a flexible strip engaging said second pulley, anchoring means for one end of said strip, means at the other end of said strip placing the latter under tension, means for releasing said bars to the pull of said strip, and means for arresting said bars in selective positions.

14. In a calculating machine as described, a plurality of alternate tens and units bars slidably arranged in the machine, a flexible connection between said bars, a pulley engaging said connection, a second pulley connected with the first pulley, a flexible strip engaging said second pulley, anchoring means for one end of said strip, means at the other end of said strip placing the latter under tension, means for releasing said bars to the pull of said strip, means for arresting said bars in selective positions, and a number wheel rotated in dependence upon the movement of said strip.

15. In a calculating machine, a number wheel, a pulley in connection with said number wheel, a flexible strip engaging said pulley, means tending to rotate said pulley, anchoring means at one end of said strip, and means for releasing said anchoring means for permitting a corresponding rotation of said pulley and therewith said number wheel.

16. In a calculating machine, a number wheel, a pulley in connection with said number wheel, a flexible strip engaging said pulley, means tending to rotate said pulley, anchoring means at one end of said strip, and means for variably releasing said anchoring means for permitting a corresponding rotation of said pulley and therewith said number wheel.

17. In a calculating machine, a plurality of number wheels, a plurality of pulleys in connection with said number wheels, flexible strips engaging said pulleys, means tending to rotate said pulleys, anchoring means for said strips, and means controlled by said number wheels for releasing the anchoring means of adjacent strips for permitting a corresponding rotation of respective pulleys and number wheels.

18. In a calculating machine, a plurality of number wheels, a plurality of pulleys in connection with said number wheels, flexible strips engaging said pulleys, means tending to rotate said pulleys, means for anchoring one end of said strips, and means for rocking said anchoring means for releasing said strips a pre-determined amount, whereby said pulleys and therewith said number wheels are correspondingly rotated.

19. In a calculating machine as described, a number setting mechanism, a result registering mechanism, feelers positioned in dependence on the result registering mechanism, and mechanical means for setting said setting mechanism by a concomitant setting operation in all denominations in dependence on the position of said feelers.

20. In a calculating machine as described, a keyboard, a result registering mechanism, feelers positioned in dependence on the result registering mechanism, slidable elements in the key board, said slidable elements having lugs spaced thereon as a vernier with reference to the key spacing, said keys having abutments for cooperating with said lugs, means for positioning said slidable elements in dependence upon the position of said feelers, and means for depressing said slidable elements, as and for the purpose described.

The foregoing specification signed at Berlin.

CHRISTEL HAMANN.